United States Patent
Sundararaj et al.

(10) Patent No.: US 11,679,895 B2
(45) Date of Patent: Jun. 20, 2023

(54) METHOD AND APPARATUS FOR AUTONOMOUS BUOY-BASED SITUATIONAL AWARENESS FOR FLYING BOATS

(71) Applicant: ROCKWELL COLLINS, INC., Cedar Rapids, IA (US)

(72) Inventors: Laveen Vikram Sundararaj, Hyderabad (IN); Nicolas Swarner, Cedar Rapids, IA (US); Jacob Bonner, Amana, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 223 days.

(21) Appl. No.: 17/130,682

(22) Filed: Dec. 22, 2020

(65) Prior Publication Data

US 2021/0276729 A1 Sep. 9, 2021

(30) Foreign Application Priority Data

Mar. 5, 2020 (IN) .............................. 202011009552

(51) Int. Cl.
*B64D 45/04* (2006.01)
*G08G 5/02* (2006.01)
*B63B 22/00* (2006.01)
*B64C 35/00* (2006.01)

(52) U.S. Cl.
CPC .............. *B64D 45/04* (2013.01); *B63B 22/00* (2013.01); *B64C 35/00* (2013.01); *G08G 5/025* (2013.01); *B63B 2022/006* (2013.01)

(58) Field of Classification Search
CPC ... B64D 45/04; B63B 22/00; B63B 2022/006; B64C 35/00; G08G 5/025
See application file for complete search history.

(56) References Cited

U.S. PATENT DOCUMENTS

| 9,061,739 | B1 * | 6/2015 | Thomson ................ B63B 22/20 |
| 9,321,529 | B1 * | 4/2016 | Jones ..................... B64C 39/022 |
| 9,457,900 | B1 * | 10/2016 | Jones ....................... B64C 27/08 |
| 9,745,078 | B2 | 8/2017 | Srivastav et al. |
| 9,752,893 | B2 | 9/2017 | Mohideen et al. |
| 10,011,334 | B2 | 7/2018 | Thales |
| 10,697,777 | B1 * | 6/2020 | Robertson ............ G01C 21/203 |
| 2015/0134298 | A1 | 5/2015 | Clark et al. |

(Continued)

FOREIGN PATENT DOCUMENTS

| FR | 2382599 | 9/1978 |
| RU | 2584954 | 5/2016 |

OTHER PUBLICATIONS

European Patent Office, European Search Report dated Aug. 3, 2021 in Application No. 21160268.5.

(Continued)

*Primary Examiner* — Peter D Nolan
*Assistant Examiner* — Demetra R Smith-Stewart
(74) *Attorney, Agent, or Firm* — Snell & Wilmer L.L.P.

(57) ABSTRACT

A method for establishing a situational awareness of a surface of a body of water is disclosed. In various embodiments, the method includes deploying a plurality of autonomous buoys under or on the surface of the body of water; and scattering the plurality of autonomous buoys to form a mesh communication network.

17 Claims, 4 Drawing Sheets

(56) References Cited

U.S. PATENT DOCUMENTS

2015/0346726 A1* 12/2015 Davoodi ................. B63B 22/20
   440/38
2019/0202530 A1* 7/2019 Rikoski .................. B63B 35/38

OTHER PUBLICATIONS

Wiebke Schmidt, et al., "Design and operation of a low-cost and compact autonomous buoy system for use in coastal aquaculture and water quality monitoring", Dec. 22, 2017, pp. 28-36, Elsevier B.V.

K. Nittis, et al., "The M3A multi-sensor buoy network of the Mediterranean Sea", May 21, 2007, pp. 229-243, Ocean Science, Copernicus GmbH on behalf of the European Geosciences Union.

* cited by examiner

METHOD AND APPARATUS FOR AUTONOMOUS BUOY-BASED SITUATIONAL AWARENESS FOR FLYING BOATS

CROSS-REFERENCE TO RELATED APPLICATIONS

This application claims priority to, and the benefit of, Indian Patent Application No. 202011009552 with DAS code D8E4, filed Mar. 5, 2020 and titled "METHOD AND APPARATUS FOR AUTONOMOUS BUOY-BASED SITUATIONAL AWARENESS FOR FLYING BOATS," which is incorporated by reference herein in its entirety for all purposes.

FIELD

The present disclosure relates generally to methods and apparatus for situational awareness and, more particularly, to methods and apparatus configured to provide flying boats with real-time awareness of conditions or structures on or piercing a water surface using autonomous buoys and sensors mounted thereon.

BACKGROUND

Land-based firefighting has been supported by flying boat operations that enable transport of large quantities of water from offshore locations—e.g., oceans or lakes—to inland regions where the firefighting occurs. Water scooping from offshore environments may be challenging for flying boat operations for many reasons, including, for example, wave or current directions or the presence of structures that may move or otherwise reside temporarily on a water body surface (e.g., boats, particularly sailboats having upright masts) or that may permanently pierce the surface (e.g., piers or docks). These challenging environments for water scooping flying boats may be exacerbated by adverse weather conditions that cause low visibility. In such situations, pilots are generally guided based on prior information gathered about the water body, the prevailing weather conditions or visual cues observable by the pilot. Accordingly, existing solutions do not typically provide comprehensive real-time situational awareness to a pilot regarding the positions of temporary or permanent fixtures that reside on or pierce the surface of a water body, particularly where the water body is generally not accessed by flying boats, excepting for the need to access water on emergency bases, and the prevailing weather conditions interfere with visual observation of the water scooping conditions.

SUMMARY

A method for establishing a situational awareness of a surface of a body of water is disclosed. In various embodiments, the method includes deploying a plurality of autonomous buoys under or on the surface of the body of water; and scattering the plurality of autonomous buoys to form a mesh communication network. In various embodiments, the method further includes establishing a communication link between the mesh communication network and a flying boat. In various embodiments, the communication link is a radio frequency link.

In various embodiments, the plurality of autonomous buoys is configured to detect an obstacle floating on or beneath the surface of the body of water. In various embodiments, each of the plurality of autonomous buoys includes an accelerometer configured to detect a wave motion. In various embodiments, each of the plurality of autonomous buoys includes a first sensor configured to detect a current velocity and a current direction. In various embodiments, each of the plurality of autonomous buoys includes a second sensor configured to detect a water depth or a range to an obstacle.

In various embodiments, the situational awareness is employed by a flying boat during a water scooping operation. In various embodiments, the method further includes establishing a communication link between the mesh communication network and the flying boat prior to approach of the flying boat toward the plurality of autonomous buoys. In various embodiments, the method includes performing the water scooping operation after establishing the communication link. In various embodiments, the method includes maintaining the communication link during the water scooping operation.

In various embodiments, the scattering of the plurality of autonomous buoys comprises activating a propulsor on each of the plurality of autonomous buoys. In various embodiments, the method includes arranging the plurality of autonomous buoys into closely packed groups for retrieval. In various embodiments, the arranging the plurality of autonomous buoys into closely packed groups for retrieval comprises activating the propulsor on each of the plurality of autonomous buoys. In various embodiments, the method includes retrieving the plurality of autonomous buoys via a flying boat.

An autonomous buoy configured for establishing a situational awareness of a surface of a body of water is disclosed. In various embodiments, the autonomous buoy includes a housing; a propulsor configured to propel the housing on or beneath the surface of the body of water; a first transceiver configured to transmit and receive data, to and from, respectively, a second autonomous buoy; and a second transceiver configured to send and receive data, to and from, respectively, a flying boat.

In various embodiments, an accelerometer is configured to detect a wave motion. In various embodiments, a first sensor is configured to detect a current velocity and a current direction. In various embodiments, a second sensor is configured to detect a water depth or a range to an obstacle.

A method for performing a water scooping operation from a surface of a body of water is disclosed. In various embodiments, the method includes deploying a plurality of autonomous buoys under or on the surface of the body of water; scattering the plurality of autonomous buoys to form a mesh communication network; establishing a communication link between the mesh communication network and a flying boat; directing the flying boat to perform the water scooping operation; arranging the plurality of autonomous buoys into one or more closely packed groups for retrieval; and retrieving the plurality of autonomous buoys.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
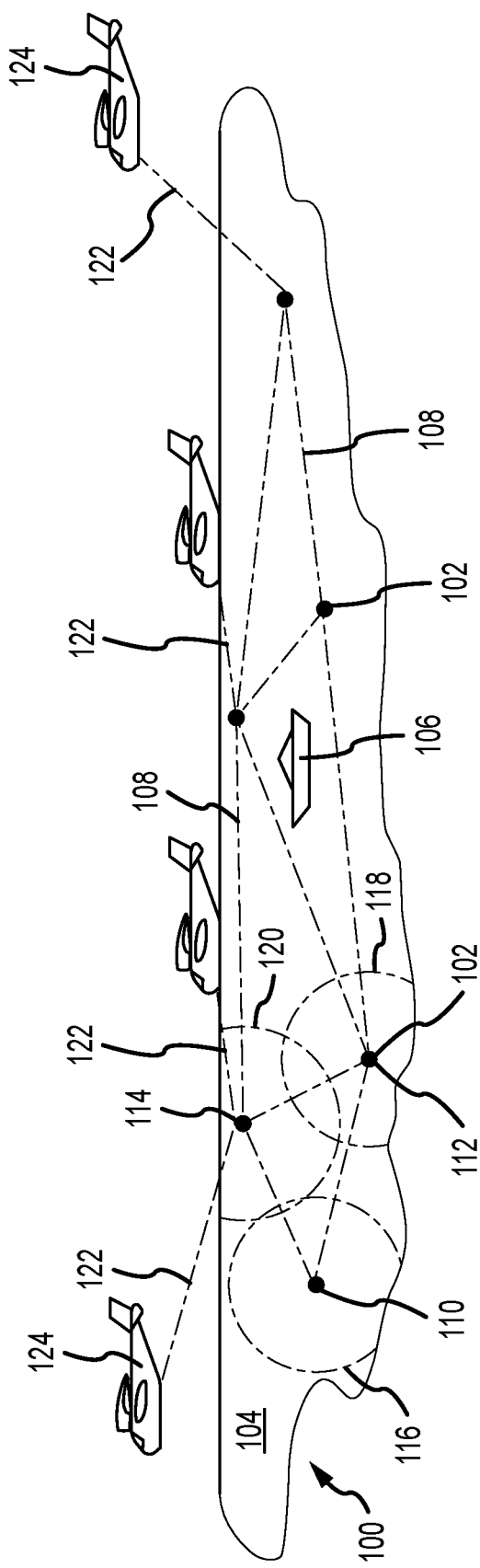
FIG. 1 illustrates a perspective view of a flying boat approaching and exiting a water scooping zone on a water body surface populated with a plurality of autonomous buoys, in accordance with various embodiments.

Referring to FIG. 1, a body of water 100 is illustrated having a plurality of autonomous buoys 102 scattered about a surface 104 of the body of water 100. An obstacle 106, such as, for example, a boat, is illustrated floating on the surface 104 of the body of water 100. While the obstacle 106 is illustrated as a boat, it shall be appreciated that the obstacle 106 may comprise any temporary or permanent structures or obstacles that float upon or pierce the surface 104 of the body of water 100, such as, for example, navigational markers, docks, piers, floating debris, flora, fauna or the like. As will be described further below, the plurality of autonomous buoys 102 is illustrated in a scattered state, such that a mesh communication network 108 may be established among the individual autonomous buoys that comprise the plurality of autonomous buoys 102.

In various embodiments, for example, a first autonomous buoy 110, a second autonomous buoy 112 and a third autonomous buoy 114 may be deployed in a region. Various sensors on each of the first autonomous buoy 110, the second autonomous buoy 112 and the third autonomous buoy 114 are configured, respectively, to detect obstacles floating on or underneath the surface of water within a first network range 116, a second network range 118 and a third network range 120. With the plurality of autonomous buoys 102 comprising sufficient numbers and packed with sufficient density, the resulting mesh communication network 108 is able to detect obstacles floating on or underneath the surface of water within the surface 104 of the body of water 100 of interest. As will be further described below, the various autonomous buoys comprising the plurality of autonomous buoys 102 are configured not only to detect obstacles, but also to detect a current direction and a current velocity, wave dynamics, such as, for example, a wave direction and a wave height, and physical characteristics of the water, such as, for example, a water temperature and a water salinity.

In various embodiments, information concerning each of the above described parameters, including obstacles, currents, wave dynamics and physical characteristics, may be compiled within the mesh communication network 108 and relayed via a communication link 122 (e.g., a radio frequency link) to a flying boat 124 approaching the surface 104 of the body of water 100 for a water scooping operation. For example, as illustrated in FIG. 1, the flying boat 124 is first shown approaching the surface 104, at which point radio frequency communication with the mesh communication network 108 is established. Information concerning obstacles, current direction and wave dynamics is then communicated to the flying boat over the communication link 122. Assuming the pilot determines a water scooping operation may be safely attempted, the flying boat 124 then descends to the surface 104 of the body of water 100 to scoop the water. Following successful scooping of the water, the flying boat 124 ascends away from the surface 104 and transports the water to the point of interest, e.g., a location within a burning forest in the proximity of the body of water 100. Advantageously, and as illustrated, the flying boat 124 may remain in contact with the mesh communication network 108 via the communication link 122 during the entire water scooping operation (e.g., approach, touchdown, scoop, takeoff, go-around), which, in various embodiments, may stretch out for a significant distance (e.g., one or two miles or more or several kilometers), enabling the pilot to abort the water scooping operation in the event an obstacle, such as, for example, a fast-moving boat, suddenly enters the path of the water scooping operation. A suitable Human Machine Interface (HMI) may be employed to guide a pilot of the flying boat 124 in carrying out the water scooping operation using the plurality of autonomous buoys 102, with the HMI configured to provide information concerning the obstacles, currents, wave dynamics and physical characteristics to the pilot.

Figure 2A:
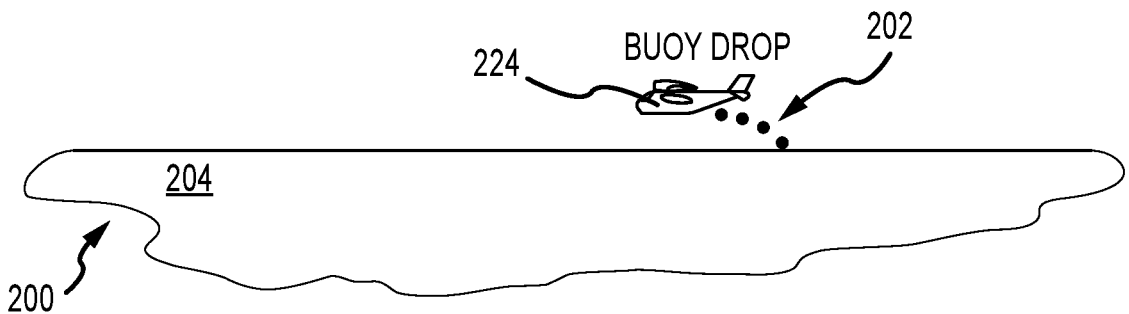
FIGS. 2A, 2B and 2C illustrate various views of a deployment, scattering and retrieval of a plurality of autonomous buoys, in accordance with various embodiments.
Figure 2B:
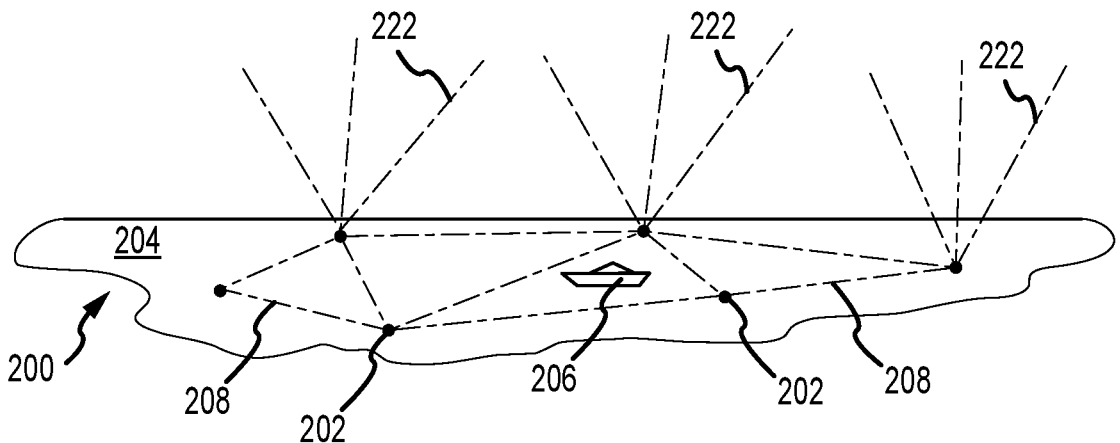
Figure 2C:
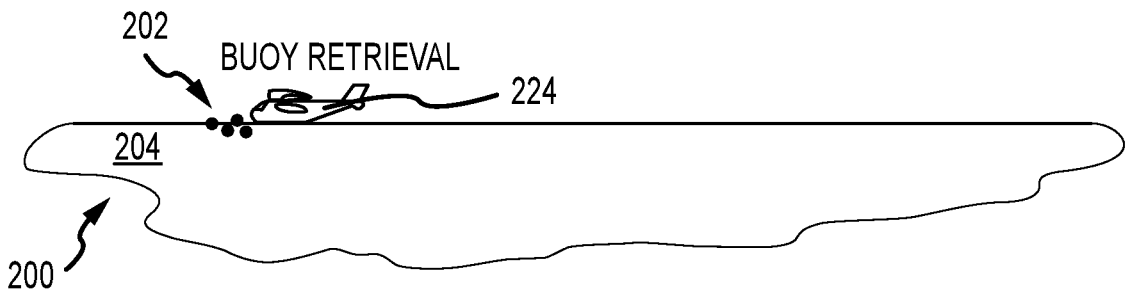

Referring now to FIGS. 2A, 2B and 2C, a sequence of steps involved with the deployment, scattering and retrieval of a plurality of autonomous buoys 202, similar to the plurality of autonomous buoys 102 described above with reference to FIG. 1, is illustrated. Referring to FIG. 2A, in a first step, a flying boat 224 approaches a body of water 200 having a surface 204 within a region where water is to be scooped during a scooping operation. In various embodiments, the flying boat 224 descends close to the surface 204 and drops or otherwise deploys the plurality of autonomous buoys 202 onto the surface 204 of the body of water 200. Referring to FIG. 2B, in a second step, the various autonomous buoys comprising the plurality of autonomous buoys 202 are scattered, autonomously, to various locations within the region in order to establish a mesh communication network 208, similar to the mesh communication network 108 described above with reference to FIG. 1. Once scattered and the mesh communication network 208 is established, a communication link 222 (e.g., a radio frequency link) is established such that the flying boat 224, when approaching the region in order to perform a water scooping operation (as described above with reference to FIG. 1), may be informed of an obstacle 206 (or a plurality of obstacles as the case may be) on or below the surface 204 of the body of water 200 within the region where the water scooping operation is to occur. Referring now to FIG. 2C, following completion of the firefighting operation, the various autonomous buoys within the plurality of autonomous buoys 202 are grouped, autonomously, in a closely packed grouping (or a plurality of closely packed groupings) or a line of autonomous buoys (or a plurality of lies of autonomous buoys) that the flying boat 224 may approach and retrieve in one or more passes. The flying boat 224 may approach the closely packed grouping and scoop or otherwise retrieve the plurality of autonomous buoys 202. In various embodiments, however, other manners of retrieving the plurality of autonomous buoys 202 may be employed, such as, for example, landing the flying boat 224 on the surface 204 of the body of water 200 or directing a boat or surface ship to the region and collecting individual ones of the plurality of autonomous buoys 202 by hand.

Figure 3A:
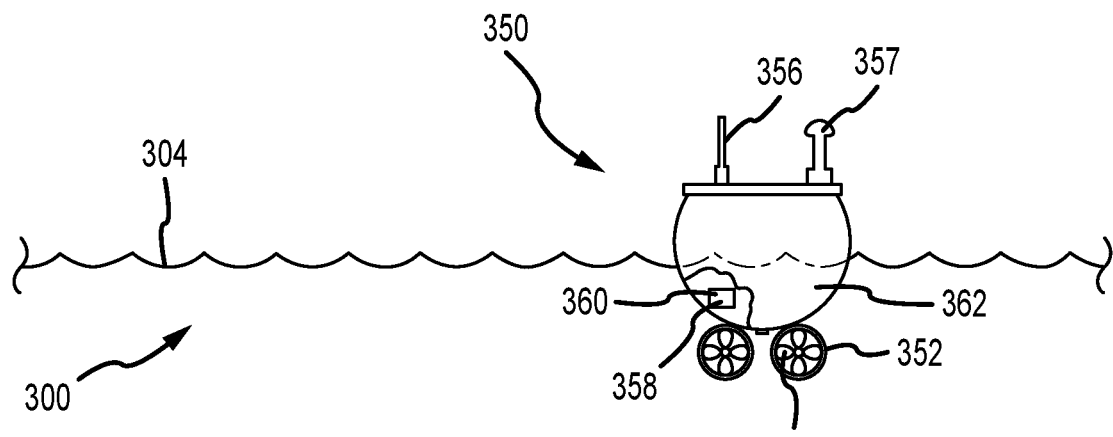
FIG. 3A illustrates an autonomous buoy on the surface of a water body, in accordance with various embodiments.
Figure 3B:
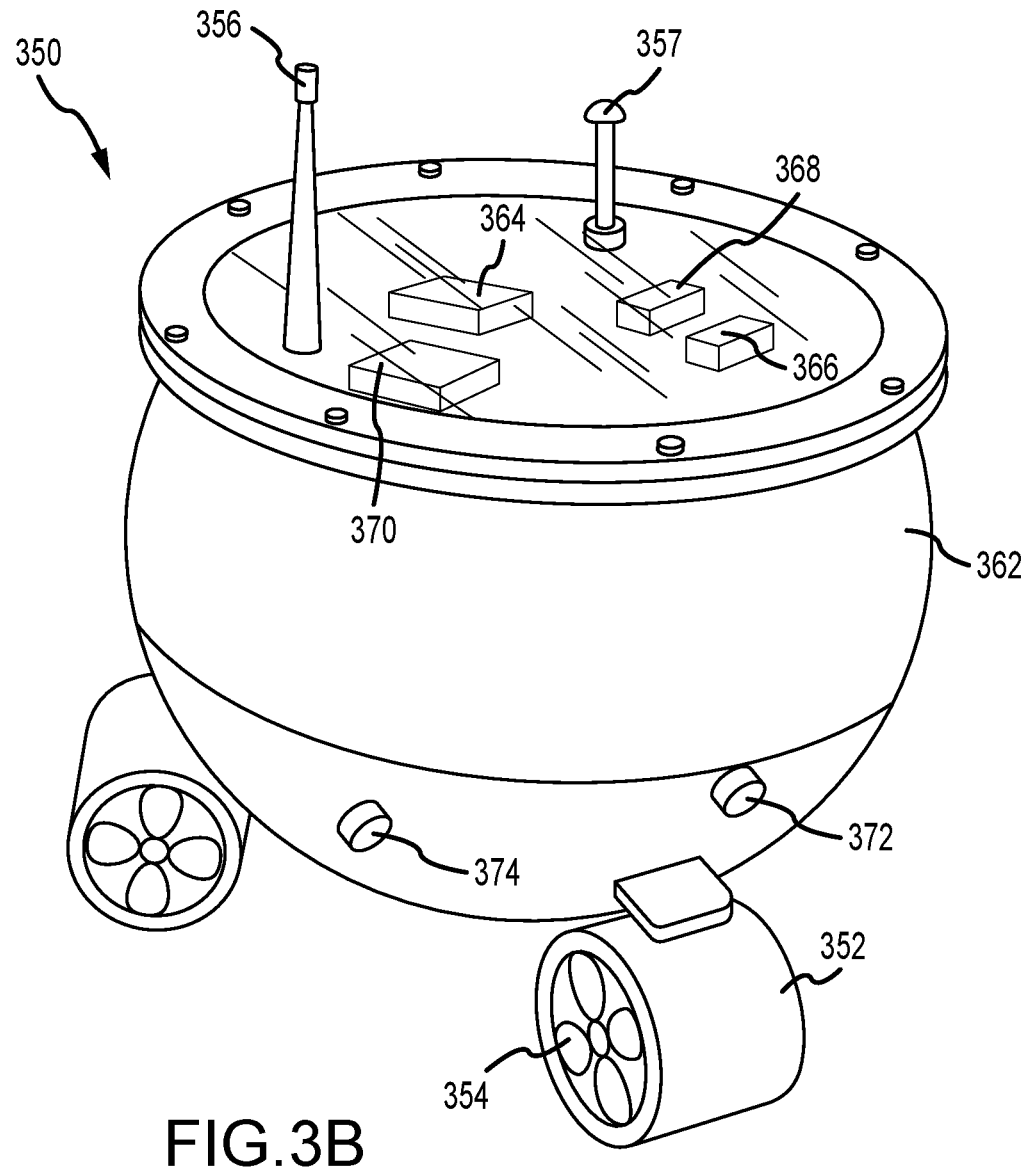
FIG. 3B illustrates a closeup schematic view of an autonomous buoy, in accordance with various embodiments.

Referring now to FIGS. 3A and 3B, various details of an autonomous buoy 350, similar to any of the plurality of autonomous buoys 102 or the plurality of autonomous buoys 202 described above with reference to FIGS. 1 and 2A-2C, are illustrated, in accordance with various embodiments. The autonomous buoy 350 includes a propulsor 352. In various embodiments, the propulsor 352 includes a propeller 354 configured to propel the autonomous buoy 350 through or over a body of water 300, typically upon a surface 304 of the body of water 300. While the propeller 354 is illustrated in FIGS. 3A and 3B, the disclosure contemplates any mechanism of propulsion, such as, for example, water paddles or wheels or water jets configured to propel the autonomous buoy 350. In various embodiments, the autonomous buoy 350 includes a first transceiver 356 configured to transmit and receive data, to and from, respectively, each autonomous buoy within a plurality of autonomous buoys. For example, information concerning the precise location of the autonomous buoy 350 within a plurality of autonomous buoys facilitates maintaining of a mesh communication network, such as the mesh communication network 108 described above with reference to FIG. 1, by enabling the autonomous buoy 350 (together with its neighboring buoys) to maintain a precise location (or mesh configuration), notwithstanding currents or wave motion tending to move the autonomous buoy 350. A second transceiver 357 may be configured to send and receive data, to and from, respectively, a flying boat (e.g., the flying boat 124 described above with reference to FIG. 1) during a water scooping operation. The second transceiver 357 may also be used to send and receive data instructing the autonomous buoy 350 to move to a different location, such as, for example, during a retrieval process of a plurality of autonomous buoys. The second transceiver 357 may also be configured to send and receive data with other aircraft or vessels in the vicinity that are not the ones that either deployed or will ultimately retrieve the autonomous buoy 350.

In various embodiments, the autonomous buoy 350 further includes various sensors 358 or other electrical, navigational or communication-based components 360 that may be contained within a housing 362, where the housing 362 may also act as a hull or a water-tight enclosure for the autonomous buoy 350. Referring to FIG. 3B, for example, in various embodiments, the autonomous buoy 350 includes an accelerometer 364. The accelerometer 364 may be configured to detect motion of the autonomous buoy 350 from a reference point. For example, the accelerometer may detect vertical or horizontal movement of the autonomous buoy 350 due to the action of wave motion. In various embodiments, the accelerometer 364 may comprise a first sensor configured to detect a current velocity or a current direction of the surface of the body of water 300. Information about wave motion may, in certain circumstances, prove important to the pilot in determining the most effective line of approach for water scooping operation to occur. The autonomous buoy 350 may also include a power supply 366 configured to supply power to the various electrical components and to the propulsor 352. A processor 368 may also be included within the autonomous buoy 350 for processing the various signals received by various of the sensors and for communicating the resulting data among the members of the plurality of autonomous buoys and to the flying boat. In various embodiments, the autonomous buoy 350 may also include a GPS receiver 370 configured to provide a precise location of the autonomous buoy 350. In various embodiments, the GPS receiver 370 or the propulsor 352 may comprise a sensor configured to detect a current velocity or a current direction of the surface 304 of the body of water 300. In various embodiments, the autonomous buoy 350 may also include an external sensor 372 (or a second sensor or a plurality of such sensors) configured to monitor the water conditions (e.g., temperature or salinity) surrounding the autonomous buoy 350. Further, in various embodiments, the autonomous buoy 350 may include an additional sensor 374 (e.g., a Depth (SONAR) or Ranging sensor (RADAR, LIDAR, IR)) configured to provide a precise depth or range of nearby obstacles around the autonomous buoy 350.

Figure 4:
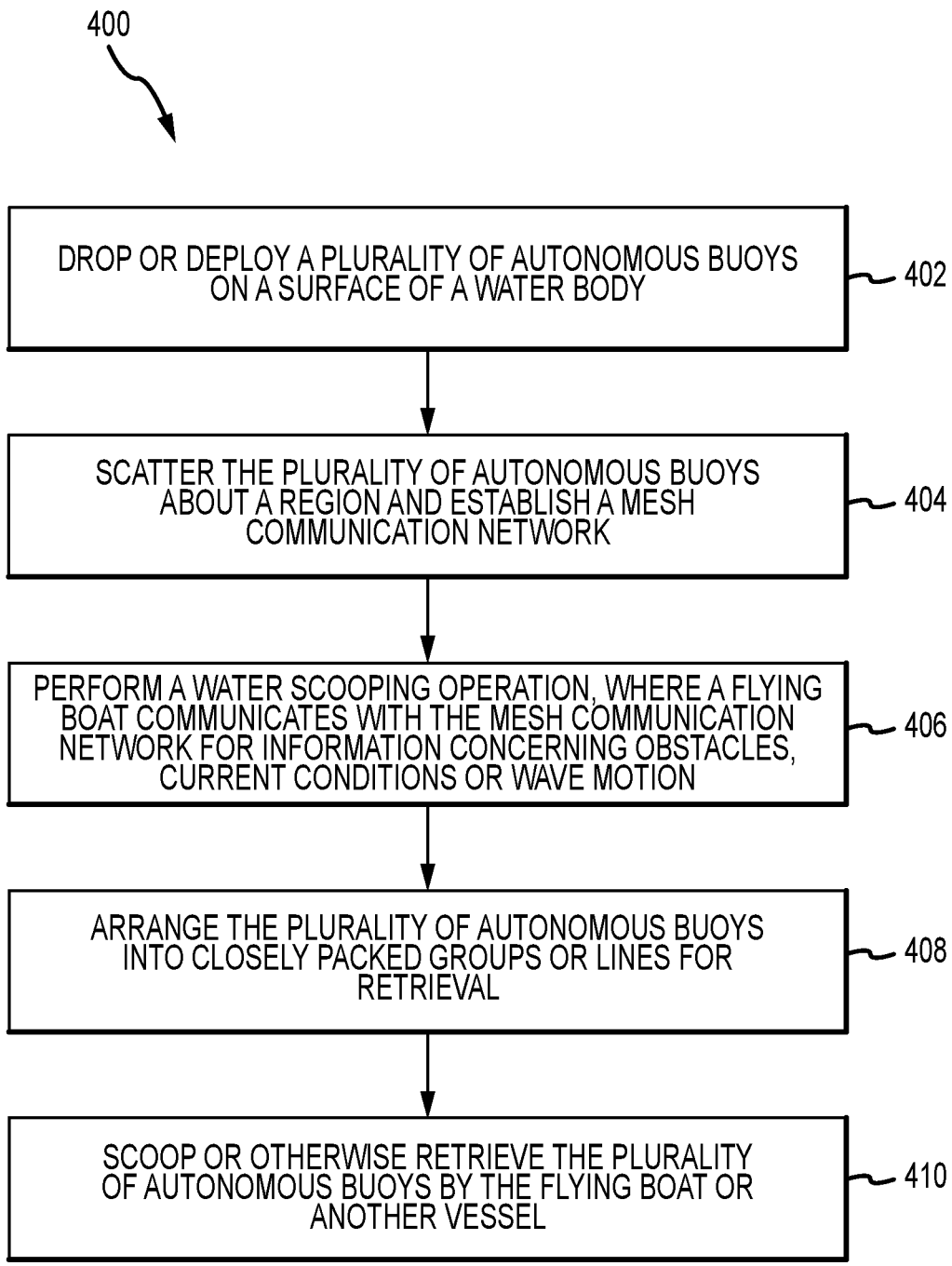
FIG. 4 describes various method steps involved in deployment, scattering and retrieval of a plurality of autonomous buoys, in accordance with various embodiments.

Referring now to FIG. 4, a method 400 for performing a water scooping operation is described as having at least the following steps. In a first step 402, a plurality of autonomous buoys is dropped or otherwise deployed on a surface of a water body. In a second step 404, the plurality of autonomous buoys is scattered about a region and a mesh communication network is established. In a third step 406, a water scooping operation is performed, where a flying boat communicates with the mesh communication network for information concerning obstacles, current conditions or wave motion. In a fourth step 408, following termination of a firefighting operation, the plurality of autonomous buoys is arranged into one or more closely packed groups or lines for retrieval. In a fifth step 410, the plurality of autonomous buoys is scooped or otherwise retrieved by the flying boat or another vessel. In various embodiments, one or more of the foregoing method steps may also be employed as a method for establishing a situational awareness of a surface of a body of water, particularly for use in performing a water scooping operation.

The disclosure provides a system for establishing a situational awareness while performing a water scooping operation. Data obtained by a plurality of autonomous buoys is received by a flying boat, processed by electronics and displayed, for example, on a screen within the flying boat. A pilot of the flying boat may then use the visual information on the screen to guide the flying boat to the surface of the water, perform the water scooping operation, and then exit the area as required to carry out a mission. The disclosed systems and apparatus provide, among other things, safety against water-based collisions with obstacles, such as, for example, boats, docks or piers and the like, even under dynamic circumstances where the obstacles are moving. Such systems and apparatus serve not only to increase safety, but to reduce pilot work load, especially when maneuvering in narrow or shallow channels or uncharted waterways. Other benefits include a reduction in cost or time associated with advance scouting or data gathering of unknown or uncharted waterways and the ability to use waterways that are closer to areas requiring water transport (e.g., areas of forest fires), thereby saving fuel costs and reducing the time required for water transport.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A method for establishing a situational awareness of a surface of a body of water to a flying boat, comprising:
    deploying a plurality of autonomous buoys under or on the surface of the body of water, the plurality of autonomous buoys being configured to detect one or more obstacles floating on or beneath the surface of the body of water;
    scattering the plurality of autonomous buoys to form a mesh communication network;
    compiling information concerning the one or more obstacles;
    establishing a communication link between the mesh communication network and the flying boat; and
    relaying the information to the flying boat approaching the plurality of autonomous buoys for a water scooping operation.

2. The method of claim 1, wherein the communication link is a radio frequency link.

3. The method of claim 1, wherein each of the plurality of autonomous buoys includes an accelerometer configured to detect a wave motion.

4. The method of claim 3, wherein each of the plurality of autonomous buoys includes a first sensor configured to detect a current velocity and a current direction.

5. The method of claim 4, wherein each of the plurality of autonomous buoys includes a second sensor configured to detect a water depth or a range to an obstacle.

6. The method of claim 1, further comprising establishing the communication link between the mesh communication network and the flying boat prior to approach of the flying boat toward the plurality of autonomous buoys.

7. The method of claim 6, further comprising performing the water scooping operation after establishing the communication link.

8. The method of claim 7, further comprising maintaining the communication link during the water scooping operation.

9. The method of claim 1, wherein the scattering of the plurality of autonomous buoys comprises activating a propulsor on each of the plurality of autonomous buoys.

10. The method of claim 9, further comprising arranging the plurality of autonomous buoys into closely packed groups for retrieval.

11. The method of claim 10, wherein the arranging the plurality of autonomous buoys into closely packed groups for retrieval comprises activating the propulsor on each of the plurality of autonomous buoys.

12. The method of claim 11, further comprising retrieving the plurality of autonomous buoys via the flying boat.

13. A system configured for establishing a situational awareness of a surface of a body of water, comprising:
   a plurality of autonomous buoys, each of the plurality of autonomous buoys further comprising:
      a housing;
      a propulsor configured to propel the housing on or beneath the surface of the body of water;
      a first transceiver configured to transmit and receive data, to and from, respectively, a second autonomous buoy; and
      a second transceiver configured to send and receive data, to and from, respectively, a flying boat.

14. The system of claim 13, further comprising an accelerometer configured to detect a wave motion.

15. The system of claim 14, further comprising a first sensor configured to detect a current velocity and a current direction.

16. The system of claim 15, further comprising a second sensor configured to detect a water depth or a range to an obstacle.

17. A method for performing a water scooping operation from a surface of a body of water, comprising:
   deploying a plurality of autonomous buoys under or on the surface of the body of water;
   scattering the plurality of autonomous buoys to form a mesh communication network;
   establishing a communication link between the mesh communication network and a flying boat;
   directing the flying boat to perform the water scooping operation;
   arranging the plurality of autonomous buoys into one or more closely packed groups for retrieval; and
   retrieving the plurality of autonomous buoys.

* * * * *